Aug. 26, 1958     L. H. HAWTHORNE     2,849,592
BUTT WELDING METAL STRIPS HAVING INFLATABLE SLITS
Filed April 2, 1957     3 Sheets-Sheet 3
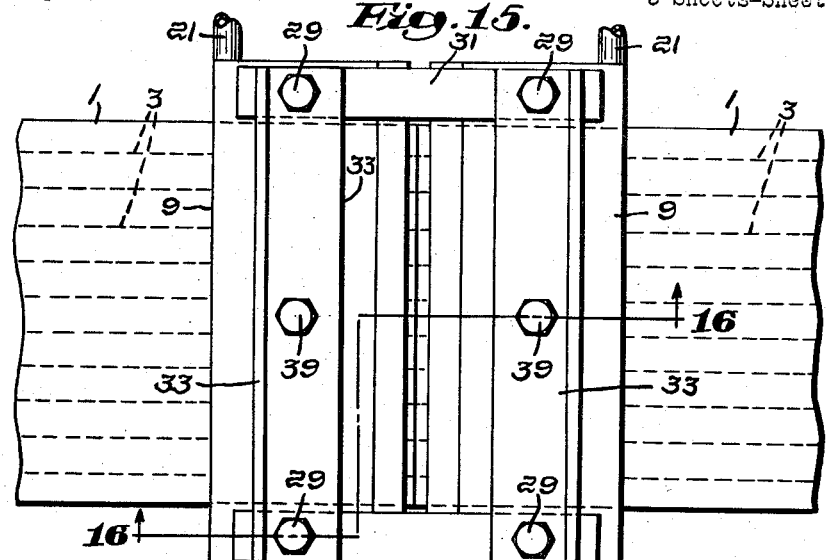
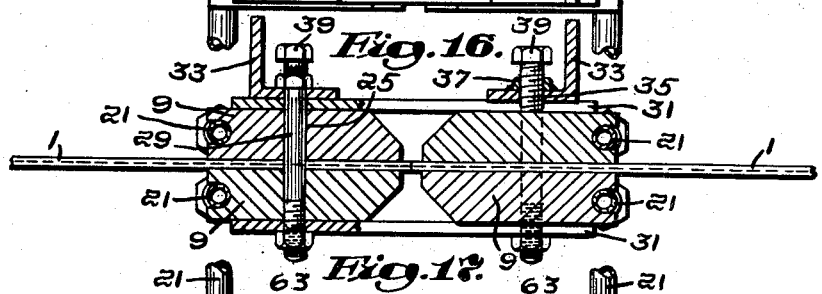
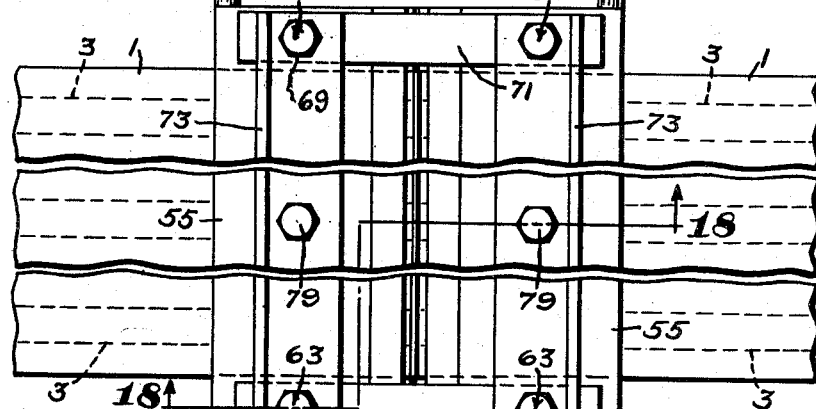
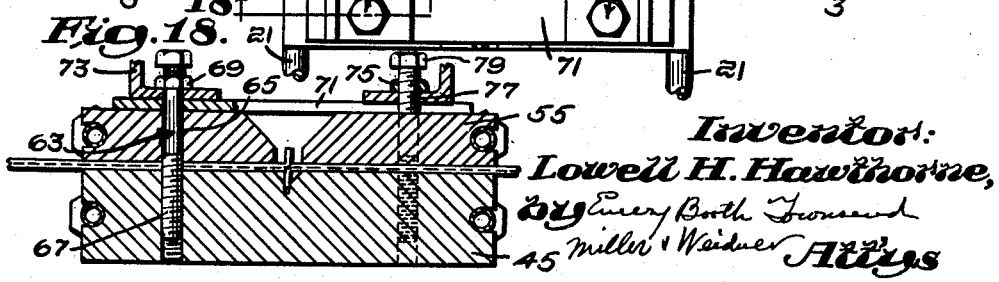
Inventor:
Lowell H. Hawthorne,

United States Patent Office 2,849,592
Patented Aug. 26, 1958

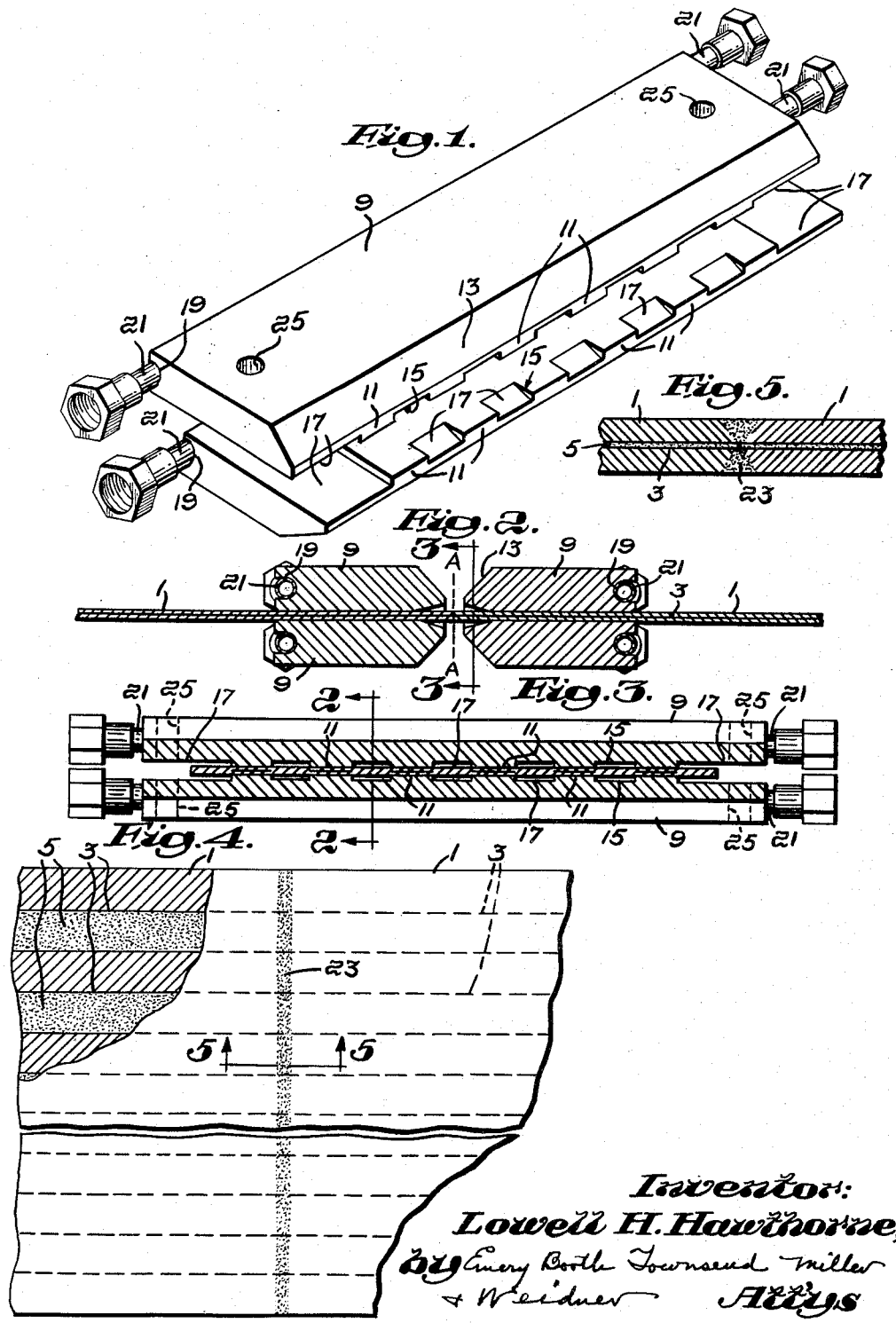

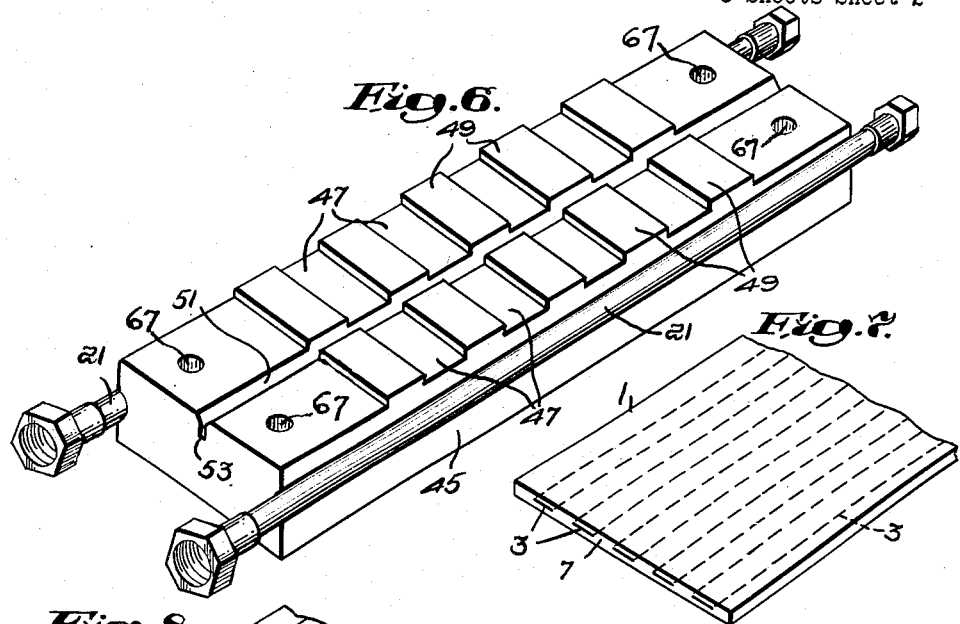
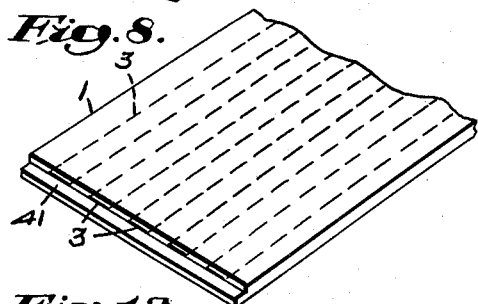
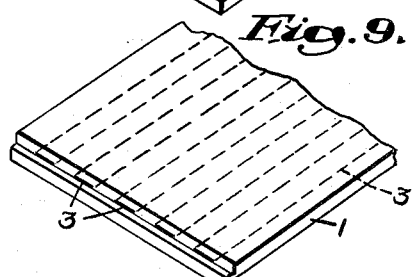
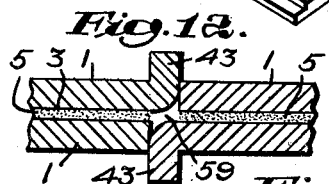
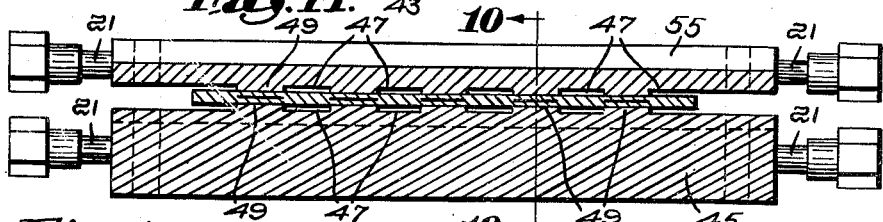
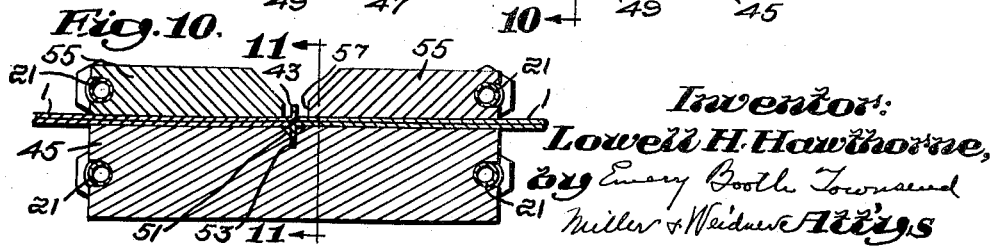

2,849,592
BUTT WELDING METAL STRIPS HAVING INFLATABLE SLITS

Lowell H. Hawthorne, Verona, N. Y., assignor to Revere Copper and Brass Incorporated, Rome, N. Y., a corporation of Maryland Application April 2, 1957, Serial No. 650,132

7 Claims. (Cl. 219—137)

My invention relates to welding the joint between endwise abutting metal strips, which strips are formed between their opposite edges and opposite faces with one or more slits extending longitudinally thereof parallel to said faces.

These strips, which may be of aluminum, copper, brass, carbon steel, stainless steel, or various other hot and cold workable metals, may be made by any of the methods disclosed by co-pending applications of Richard A. Wilkins, Serial Number 518,768, filed June 29, 1955, and Serial Number 570,372, filed March 8, 1956.

According to the methods of said co-pending applications, a thick metal billet may be formed by casting the metal about one or more rods or strips of rectangular cross-section of pulverizable material such as, but without limitation thereto, soapstone or graphite, the wider flat sides of the rods or strips being parallel to the faces of the billet. This billet is then rolled to reduce its thickness and to elongate it in the direction of the lengths of the pulverizable members to produce the metal strip. During the initial part of such rolling the pulverizable members are crushed to a fine weld preventing powder which, as the opposite sides of the spaces occupied by those members are moved toward each other by thinning of the billet, is spread along such spaces and the slits. In ordinary practice the strips will be of relatively thin gauge, commonly about 0.015 to 0.060 inch, and the residual layer of weld preventing powder in the slits will be in the form of a rather attenuated film say one in the order of 0.0001 inch in thickness. These films position the opposite sides of the slits in slightly spaced relation and tend to adhere to those sides. These slits may be expanded to form passages by introduction into them of pressure fluid.

An object of the invention is to fusion butt weld to each other the endwise abutting ends of the above described metal strips with the slits of one in alignment with and communicating with those of the other.

In the drawings:

Fig. 1 is an isometric exploded view of one form of a pair of the heat conductive members for chilling the slitted portions of the strips adjacent the joint being welded;

Fig. 2 is a section on the line 2—2 of Fig. 3;

Fig. 3 is a section on the line 3—3 of Fig. 2;

Fig. 4 is a plan view of a pair of welded together strips, with parts broken away;

Fig. 5 is a section on the line 5—5 of Fig. 4, on an enlarged scale, in which for convenience of illustration the thickness of the weld preventing material in the slits is much magnified with relation to the thicknesses of the strips;

Fig. 6 is an isometric view of a modified form of heat conductive member;

Fig. 7 is an isometric view of the end portion of one of the strips to be welded;

Figs. 8 and 9 illustrate steps in forming the end portions of the metal strips when they are to be butt welded together according to another form of the method;

Fig. 10 is a section on the line 10—10 of Fig. 11;

Fig. 11 is a section on the line 11—11 of Fig. 10;

Figs. 12, 13 and 14 are diagrams illustrating steps in the method of welding together the abutting ends of the metal strips according to Fig. 9;

Fig. 15 is a plan view of the strips according to Figs. 3 and 4 positioned in a fixture and employing the heat conductive members according to Fig. 1 during the welding operation;

Fig. 16 is a section on the line 16—16 of Fig. 15;

Fig. 17 is a plan view of the strips according to Fig. 9 positioned in a fixture and employing the heat conductive members according to Figs. 6, 10 and 11 during the welding operation; and Fig. 18 is a section on the line 18—18 of Fig. 17.

Referring to Figs. 1 to 5 and 7, the above described strips 1 to be butt welded together are each formed with a row of spaced slits 3, each slit containing the hereinbefore mentioned layer 5 of weld preventing powder. An end of each of a pair of these strips is then cut to produce a flat and square edge 7 (Fig. 7), these edges then being placed in a fixture hereinafter described with said edges abutting each other along a plane indicated by the line A—A (Fig. 2). At each of the opposite sides of the joint between the strips is placed at each side of the abutting strips a member 9 conveniently formed of a flat bar of heat conductive metal such as copper. Adjacent edges 11 of these bars are positioned in spaced relation to each other and to the joint between the strips a distance no more than necessary conveniently to permit an arc to be struck against the metal at the joint, and to the same end the outer portions of said edges are beveled as indicated at 13. As best shown in Figs. 1, 2 and 3, the bars at their edges 11 are formed at their faces opposed to the faces of the strips with notches 15 of the same widths as the spaces between the slits, and each notch being positioned directly opposite one of those spaces, the inner walls 17 of the notches being preferably inclined toward the adjacent faces of the strips as said walls recede from the bar edges 11 so as to intersect at their portions remote from said edges the faces of the bars which contact the strips.

It will be observed in the construction so far described that when the bars 9 are assembled with the abutting strips the faces of the bars opposed to the strips contact adjacent the joint the portions of the strips opposite the slits, while said faces of the bars adjacent the joint do not contact the unslitted portions of the strips. As a result the bars act strongly to conduct heat away from the joint between the thinner metal directly opposite the slits at each side of the strips, but do not act so strongly to conduct heat away from the unslitted portions of the strips. Preferably for chilling the bars 9 their edges opposite the edges 11 are grooved as indicated at 19, and in these grooves are placed and brazed lengths of pipe 21 of heat conductive material, such as copper, through which pipes may be passed cooling water by coupling their ends to suitable water hoses (not shown).

The arc employed is preferably struck against the metal of the strips adjacent the joint from a substantially non-consumable electrode, such as tungsten or carbon, in an inert shielding atmosphere of gas such as helium. This arc is caused to travel transversely of the abutting strips along the joint preferably first at one side of the strips and then at their other side. The arc employed is of sufficient intensity to fuse together the metal adjacent the joint at the unslitted portions of the strips down to the plane of the slits or for a slightly greater distance so that the unslitted portions will be fusion welded together by the traverse of the arc over the two sides of the strips for the full thickness of those portions. However, because of the slight spacing between the opposite walls of each of the slits the heat conductivity across the slits is much reduced, and because of the contact of the bars 9 with the strips at their portions directly opposite the slits the net heating effect of the arc on those portions is reduced, with the overall result that traverse of the arc at one side of the abutting strips will not weld the metal at the slitted portions at the opposite side of the abutting strips and will not cause liquefaction of the thinner metal at the slitted portions at the side of the strips against which the arc is being struck sufficient to interrupt communication between the slits of the two strips, as indicated in Fig. 5 by the weld 23, or liquefy the thinner metal at each side of the slits sufficiently to cause holes at the weld placing the slits in communication with the outer faces of the strips at the weld. Without employment of the heat conductive members it would be necessary in order to prevent such liquefaction first to weld together the thicker unslitted portions of the strips by use of an arc sufficient intensity to operate satisfactorily on those thicker portions and then weld together the thinner metal opposite the slits with an arc of lesser intensity, an arc of this lesser intensity not acting to weld satisfactorily the thicker unslitted portions because of the tendency of the thicker metal to more rapidly conduct heat away from the arc than the thinner metal.

The lengths of the bars 9 may be no more than the distance between the edges of the slits adjacent the opposite edges of the strips. However, to aid in clamping the bars to the strips the bars conveniently may be of such length as to project beyond opposite edges of the strips as shown in Fig. 3, the projecting portions of the bars at opposite sides of the strips being provided with aligned holes 25 for receiving clamping bolts extending between the strips.

As shown in Figs. 15 and 16, the strips 1 to be welded and the heat conductive members or bars 9 may be assembled in a fixture while the strips are being welded. As shown, this fixture comprises clamping bolts 29 extending through the aligned holes 25 formed in the portions of the bars 9 that project beyond the opposite edges of the strips. These bolts also pass through perforations, aligned with the holes 25, which perforations are formed in the end portions of bars 31 resting on the outer surfaces of the bars 9 at opposite sides of the strips and extending across the plane of the joint to be welded, the bolts further extending through perforations in the end portions of angle-irons 33 resting on the outer surfaces of the bars 31 and extending transversely across the strips. By this construction, when the bolts 29 are tightened the bars 9 will be clamped against opposite faces of the strips, the bars 31 serving to hold the end edges of the strips in abutting relation. For further clamping the bars 9 to the strips the angle-irons 33 may be formed intermediate their lengths with one or more perforations 35, to the upper sides of which angle-irons nuts 37 in alignment with said perforations and resting on said angle-irons are welded, through which nuts screw-threadedly pass the shanks of tap-bolts 39, the free ends of said shanks bearings upon the upper surfaces of the upper bars 9 as viewed in Fig. 16. Tightening of these tap-bolts acts to force the uppermost bars 9, as viewed in Fig. 16, toward the lowermost bars so as to aid in clamping the strips between said bars.

The strips may also be welded by a method the steps of which are indicated by Figs. 8 to 14. According to this method the end edge 7 of each strip is rabbeted by a machining operation, such as milling, to form a flange 41 (Fig. 8), the upper surface of which flange is in the plane of the slits 3. The flange is then bent downwardly, as viewed in Fig. 9, to form a flange 43 projecting outwardly of the lower face of the strip. The two strips are then placed in abutting relation on the heat conductive member 45, formed of a bar of heat conductive metal such as copper, the upper surface of which bar is formed with spaced grooves 47 providing between them raised bands 49. These grooves are of the same widths as the spaces between the slits and the bands are of the same widths as the slits, the slitted portions of the strips resting on the bands and the unslitted portions being opposite the grooves.

As shown, the bar 45 is formed on its upper surface with a groove 51 normal to the grooves 47 for receiving the lowermost flange 43 of the abutting strips, the flange fitting the narrower lower portion 53 of the groove, the upper portion of the groove having the outwardly flaring side walls facilitating insertion of the flange in the groove.

At each of the opposite sides of the joint between the abutting strips placed on the bar 45 is placed a narrower bar 55 of heat conductive metal such as copper, the opposed edges 57 of the two bars 55 being in spaced relation for permitting traverse of the welding arc between them. These bars 45 may be identical with the bars 9 of Figs. 1 to 3, but preferably are grooved in the same way as the bar 45.

In welding the joint between the strips according to Figs. 9 to 14 the arc is first traversed along the uppermost flange 43 to weld the joint at the upper side of the strips, and after such weld has been effected the bars 55 are removed, the strips turned over to place uppermost the lowermost flange as viewed in Fig. 10, and the bars 55 then replaced, whereupon the arc is traversed along the last mentioned flange for completing the weld.

The rabbeting of the strips at their abutting edges, as above described, ordinarily inadvertently removes the weld preventing material from the flange 41 formed by such rabbet. This leaves a space 59 (Fig. 12) between the inner curved ends of the flanges as diagrammatically shown in Fig. 12. This space due to the attenuated thickness of the layer of weld preventing material is of course of minute dimensions. It however, in conjunction with the chilling effect of the bars 45 and 55, effectively acts to prevent metal from flowing downwardly over the edges of the slits. The flanges 43 are melted down by the arc to provide additional weld metal for strengthening the joint, which metal fuses into the metal of the strips at the upper side of the slits to form a weld diagrammatically indicated at 61 (Figs. 13 and 14). As heretofore refered to in connection with Figs. 1 to 5, the arc may be continuously of the same intensity sufficient to weld the thicker metal between the slits down to slightly below the plane of the slits, the contact of the raised portions of the bars 45 and 55 with the thinner metal opposite the slits reducing the heating effect of the arc on such thinner metal so as effectively to weld it without unduly liquefying it or liquefying it to such extent as would cause holes to be formed in the weld that would place the slits in communication with the outer faces of the strips.

The abutting strips having the flanges 43 may be placed with the bars 45 and 55 in the welding fixture according to Figs. 17 and 18 for holding them in assembled relation while performing the welding operation. As shown, the strips are clamped between the bar 45 and each bar 55 by tap-bolts 63 extending through perforations 65 in those portions of the bars 55 which project beyond the edges of the strips, said bolts being screwthreadedly received in perforations 67 aligned with the perforations 65 and formed in the corresponding portions of the bar 45. If desired, there may be placed on the bars 55 a pair of bars 71 extending from one bar 55 to the other, the tap-bolts passing through perforations formed in opposite end portions of these bars 71. On the upper surfaces of these bars 71 between them and the bolt heads 69 of the tap-bolts 63 may be placed the end portions of angle-irons 73 extending transversely of the strips, the tap-bolts extending through perforations formed in such angle-irons. Tightening of the tap-bolts therefore not only clamps the strips between the bars 45 and 55 but also clamps the bars 71 and the angle-irons 73 to the bars 55. As shown, intermediate the length of each angle-iron 73 is welded thereto a nut 75 aligned with a perforation 77 in the angle-iron. Screw-threaded into this nut and extending through this perforation is the shank of a tap-bolt 79 the free end of which bears against the upper surface of the adjacent bar 55 so that by tightening the tap-bolts said bar is forced toward the bar 45 to augment the clamping effect of the tap-bolts 63.

It will be understood that within the scope of the appended claims wide deviations may be made from the forms of the invention herein described without departing from the spirit of the invention.

I claim:

1. The method of butt welding metal strips having between their opposite faces and parallel thereto slits extending longitudinally thereof with unslitted metal at each of opposite sides of each of the slits, and with the slit or slits of each strip aligned with and communicating with those of the other upon said strips being so welded, comprising positioning a pair of the strips in endwise abutting relation with the slits thereof in alignment, striking an arc from a substantially non-consumable electrode against each face of the abutting strips at the joint between them and traversing such arc longitudinally of said joint, the arc being of sufficient intensity to fuse together at the joint the metal lying between the plane of the slits and the face of the abutting strips against which the arc is struck; and preventing the arc struck against each face of the abutting strips from liquefying the metal at and adjacent the joint and lying between the aligned slits and that face by contacting those portions only of said face which lie at opposite sides of the joint adjacent the joint and opposite the slits with a heat conductive member effective by heat conduction to reduce the heating effect of the arc on the metal at and adjacent the joint lying between said face and the aligned slits.

2. The method of butt welding metal strips having between their opposite faces and parallel thereto slits extending longitudinally thereof with unslitted metal at each of opposite sides of each of the slits, and with the slit or slits of each strip aligned with and communicating with those of the other upon said strips being so welded, comprising positioning a pair of the strips in endwise abutting relation with the slits thereof in alignment, striking an arc from a substantially non-consumable electrode against each face of the abutting strips at the joint between them and traversing such arc longitudinally of said joint first at one face of the abutting strips and then at the opposite face thereof, the arc being of sufficient intensity to fuse together at the joint the metal lying between the plane of the slits and the face of the abutting strips against which the arc is struck; and preventing the arc struck against each face of the abutting strips from liquefying the metal at and adjacent the joint and lying between the aligned slits and that face by contacting those portions only of both of said faces of the abutting strips which lie at opposite sides of the joint adjacent the joint and opposite the slits with a heat conductive member effective by heat conduction to reduce the heating effect of the arc on the metal at and adjacent the joint lying between said face against which the arc is struck and the aligned slits.

3. The method according to claim 2 in which the slits of the strips contain a layer of weld preventing material acting to space the opposite sides of the slits from each other at the joint.

4. The method according to claim 2 in which the heat conductive members are water cooled for chilling them.

5. The method according to claim 2 in which each strip has a row of the slits the sides of which are in slightly spaced relation at the joint, there being a heat conductive member at each of the opposite sides of the joint at each of the opposite sides of the strips; which members have spaced portions, of the widths of the slits, that adjacent the joint severally contact the faces of the strips at those portions only of said faces which are opposite the slits.

6. The method according to claim 2 in which each strip has a row of the slits the sides of which are in slightly spaced relation at the joint, there being a heat conductive member at each of the opposite sides of the joint at each of the opposite sides of the strips comprising separate heat conductive members at one side of the abutting strips which adjacent the joint severally contact the faces of the strips at that side at those portions only of said faces which are opposite the slits, and comprising a heat conductive member at the opposite sides of the abutting strips which extends over the joint and also contacts the faces of the strips adjacent the joint at portions only of said faces which are opposite the slits.

7. The method according to claim 2 in which the opposite sides of the slits are slightly spaced from each other, the abutting ends of the strips prior to welding them being operated upon to reduce their thicknesses from one face thereof down to the plane of the slits and the remaining metal at such reduced portions bent to form narrow flanges which when the strips are positioned in endwise abutting relation lie directly opposite each other and extend outwardly from opposite faces of the abutting strips and along the joint between the strips with the outer side of each abutting that end edge of the adjacent strip which is formed by so reducing its thickness, each of which flanges provides filler metal that is melted down by the arc and fuses into the portions of the strips at the joint at the same sides of the slits as the flange.

References Cited in the file of this patent

UNITED STATES PATENTS

| | | |
|---|---|---|
| 1,604,181 | Lincoln | Oct. 26, 1926 |
| 1,969,840 | Goddard | Aug. 14, 1934 |
| 2,719,900 | Persson | Oct. 4, 1955 |
| 2,784,299 | Matther | Mar. 5, 1957 |